G. A. GREGERSON & C. O. WEYMOUTH.
Blinder for Bridles.
No. 227,764. Patented May 18, 1880.
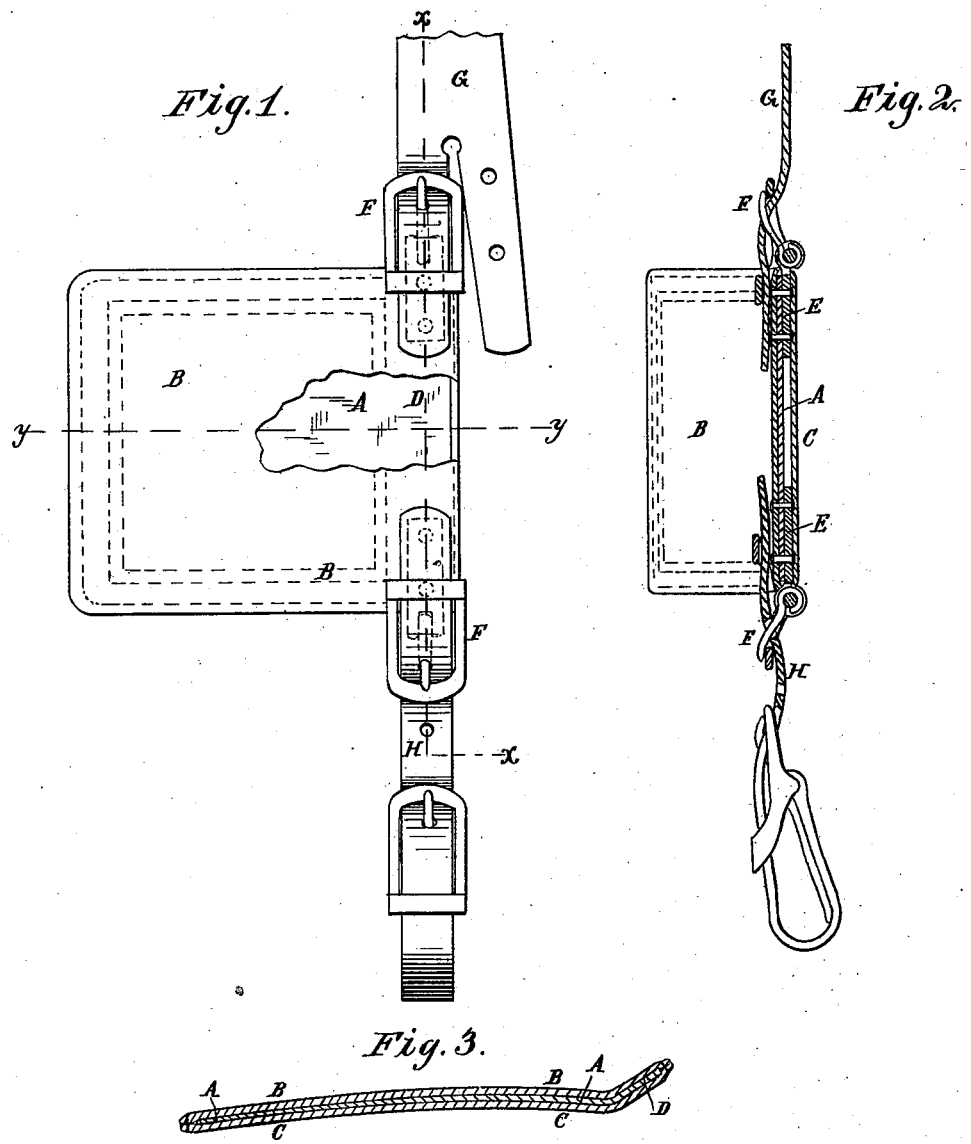
WITNESSES:
Henry N. Miller
C. Sedgwick
INVENTOR:
G. A. Gregerson
C. O. Weymouth
BY Munn & Co
ATTORNEYS.

UNITED STATES PATENT OFFICE.

GEORGE A. GREGERSON, OF ROCHESTER, AND CHARLES O. WEYMOUTH, OF OLMSTED COUNTY, MINNESOTA.

BLINDER FOR BRIDLES.

SPECIFICATION forming part of Letters Patent No. 227,764, dated May 18, 1880.

Application filed February 17, 1880.

To all whom it may concern:

Be it known that we, GEORGE A. GREGERSON, of Rochester, Olmsted county, and State of Minnesota, and CHARLES O. WEYMOUTH, of said county and State, have invented a new and useful Improvement in Harness-Blinders, of which the following is a specification.

Figure 1 is a side elevation of our improvement. Fig. 2 is a sectional elevation taken through the line $x\,x$, Fig. 1; and Fig. 3 is a cross-section taken through the line $y\,y$, Fig. 1.

Similar letters of reference indicate corresponding parts.

The object of this invention is to increase the strength and durability of harness-blinders.

The invention consists in the combination, with the blind-plate, of metallic hinge-plates for connecting the blind with the head-piece and the bit-strap, as will be hereinafter fully described.

A represents the metal plate of the blind, which may be covered upon the outer and inner sides, respectively, with leather B C, or left uncovered, as may be desired.

The rear side of the metal blind-plate A is extended, and the extension D thus formed is bent outward at such an angle with the plane of the blind-plate as will give the blind a proper position when the extension D rests against the horse's cheek. To the upper and lower ends of the extension D are secured, by rivets, metallic hinge-plates E, to receive buckles, rings, or other devices, F, for connecting the blind with the head-piece G and the bit-strap H.

By this construction the extension D of the blind-plate A serves as a cheek-piece, so that no cheek-strap will be required, thus lessening the amount of stock and the amount of labor required in making the headstall, and at the same time producing a neater and simpler headstall. This construction also makes the blind stronger and more durable, as the said blind is not liable to get out of shape or become loose and flap, as it is liable to do when connected with a cheek-piece by sewing its cover to the said cheek-piece in the usual manner.

Having thus described our invention, we claim as new and desire to secure by Letters Patent—

In harness-blinders, the combination, with the extension D of the blind-plate A, of metallic hinge-plates E, substantially as herein shown and described, for connecting the blind with the head-piece and bit-strap, as set forth.

GEORGE AUGUST GREGERSON.
CHARLES ORAL. WEYMOUTH.

Witnesses:
H. A. ECKHOLDT,
G. A. LANE.